May 26, 1964  J. W. HORNER ETAL  3,134,352
HOT GAS SERVO SYSTEM

Filed July 17, 1959  3 Sheets-Sheet 3

Inventors
JOHN W. HORNER
WILLIAM L. HAMILTON
by
Attys.

United States Patent Office 3,134,352
Patented May 26, 1964

3,134,352
HOT GAS SERVO SYSTEM
John W. Horner, Whittier, and William L. Hamilton, Hawthorne, Calif., assignors to Thompson Ramo Wooldridge Inc., Cleveland, Ohio, a corporation of Ohio
Filed July 17, 1959, Ser. No. 827,896
7 Claims. (Cl. 114—20)

The present invention relates broadly to servo systems, and is more particularly concerned with a new and improved hot gas servo system having among its features increased reliability and structural simplicity providing substantial cost and weight savings.

It is an important aim of the present invention to provide a servo system utilizing high temperature and high pressure gases from the main propulsion system of a vehicle, and which finds important applications in the actuation of hydrodynamic surfaces on torpedoes and the like.

Another object of this invention is to provide a servo system employing a housing member of novel construction having hot and cold zones, the hot zone being provided by exhaust gases from the propulsion system to maintain components of the housing member at a sufficiently high temperature to inhibit carbon deposition, the cold zone being provided by exposure to ambient conditions in which the torpedo or the like operates.

Still another object of the invention lies in the provision of a hot gas servo assembly featuring a unitized assembly which may be completely bench checked prior to installation in the vehicle.

A further object of the instant invention is to provide a housing member for use in combination with a vehicle having a propulsion system and mounting a tail assembly and control surfaces, the housing member being supported by the tail assembly and being provided with a plurality of openings communicating with the propulsion system supply to direct hot gases therefrom and to mount means for actuating the control surfaces, a first group of said openings being in the form of a plurality of annular passages and connecting radial passages and a second group of the openings being shaped to provide chambers for the actuator means, the path of hot gas flow being from the propulsion system supply to the radial passages and therefrom to the annular passages and chambers, the housing member being further provided with passageways receiving exhaust gases from the propulsion system to heat the housing member and maintain the first group of passage above a predetermined temperature to reduce carbon deposition therein.

A still further object of this invention lies in the provision of a servo assembly for use in the actuation of movable members supported by a vehicle having a propulsion system, the assembly comprising a housing provided with a plurality of gas flow passages and a plurality of piston chambers communicating therewith, means for mounting the housing on the vehicle and connecting the housing passages with the propulsion system to provide a pressurized high temperature gas flow to the piston chambers, each of the chambers receiving piston means connected to each of the movable members and the housing mounting valve means to control the hot gas flow to the piston chambers, the vehicle supporting solenoid means which are connected with the valve means to open and close said valve means and the solenoid means being exposed to a coolant fluid to maintain the temperature thereof sufficiently low for proper operation, while the housing is heated by gases from the propulsion system to maintain the passages in said housing and the piston and valve means at a sufficiently high temperature to minimize carbon deposition.

Other objects and advantages of the invention will become more apparent during the course of the following desription, particularly when taken in connection with the accompanying drawing.

In the drawings, wherein like numerals are employed to designate like parts throughout the same;

Figure 1:
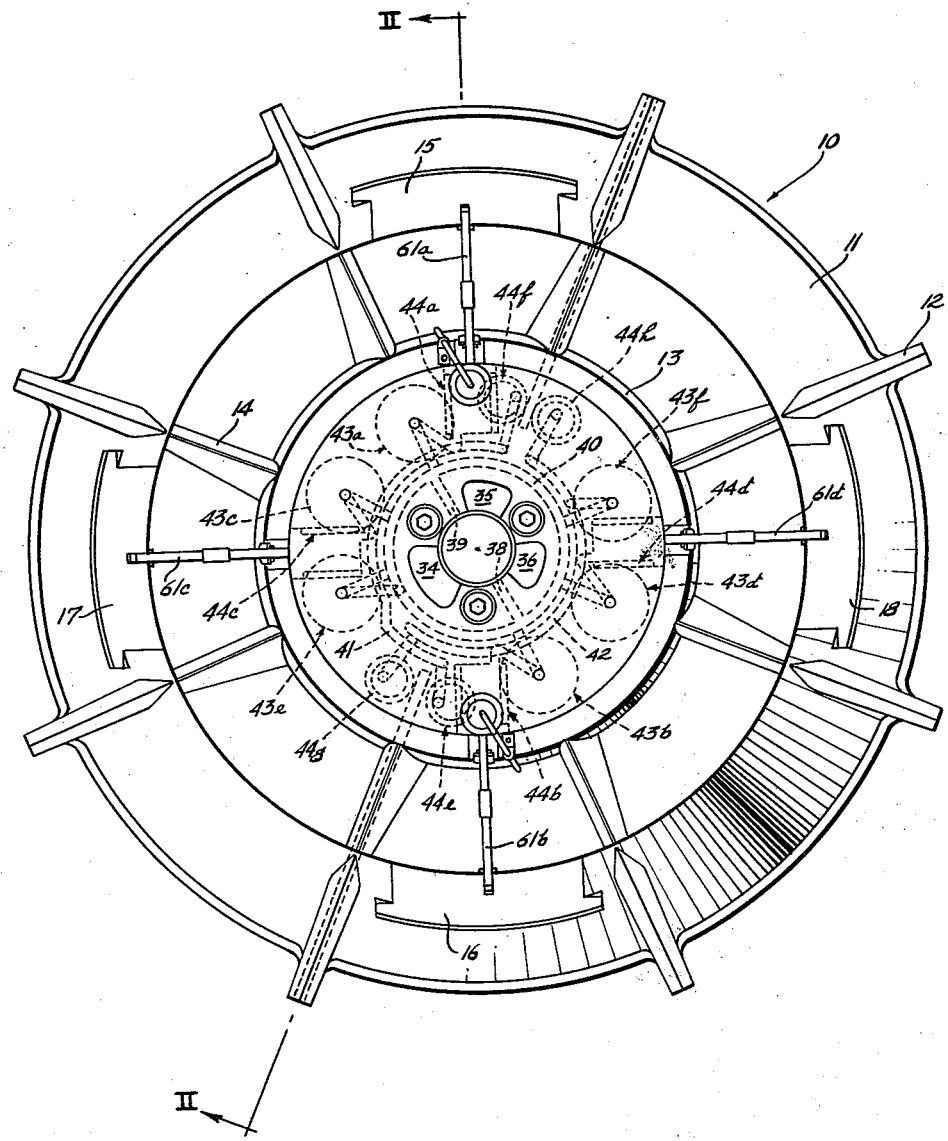
FIGURE 1 is an end view of a servo assembly constructed in accordance with the principles of this invention, and shown for purposes of illustration supported by the tail cone assembly of a torpedo.

The servo assembly shown in the drawings and to be described herein is of important application in the actuation of hydrodynamic control surfaces on torpedoes, and in this environment eliminates the intermediate turbine drive, hydraulic pump, hydraulic reservoir and related components which are required in a hydraulic actuation system. While as so implied the instant servo assembly produces the resulting advantages of improved system reliability and cost and weight savings, the invention is not limited to the actuation of hydrodynamic control surfaces, and may well be employed on airborne vehicles for similar and different purposes.

Briefly treated, the invention as illustrated is supported by the tail cone assembly of known torpedoes by means of a passaged adapter connecting with the thrust tube assembly of the turbine engine. The adapter supports a housing member having exhaust passageways and gas flow passages, the passageways receiving exhaust gases from the engine to maintain the temperature of the passages in the housing member and the components connecting therewith, so that carbon deposition is inhibited and excessive gas consumption reduced. The flow path of hot gases to drive the actuator means for the control surfaces is preferably first through a plurality of generally radially disposed passages communicating with a plurality of annular passages connected to the cylinders or chambers mounting the piston or equivalent portions of the actuator means.

The pistons for the pitch and yaw control actuators are provided with spherical head portions reciprocable in cylinders formed in the housing member to permit a degree of misalignment with the control surface without piston binding and to also permit some off-center motion at the point of connection with the surface and resulting from motion about the hinge point thereof. The actuator means for the roll control surfaces, on the other hand, is preferably in the form of a pair of spaced pistons acting against a resilient stabilizer fastened at its center point to the shaft supporting the roll control surface. All control surfaces are held in a neutral position without electrical power or gas pressure, and accordingly, the control surfaces return to neutral in the event of a power failure. Solenoid valve means control the hot gas flow to all actuator means, and to actuate a particular control surface the appropriate solenoid is energized which opens the corresponding hot gas valve to permit flow to the surface actuator to extend the same to a full open position. Gas continues to flow through actuator bleed ports and is discharged overboard. The actuator remains in the full open position and the surface fully extended as long as the hot valve remains open. To retract the surface, the valve solenoid is merely de-energized, and hot gas flow to the actuator ceases while any gas remaining in the actuator is ported through the bleed openings and permits a return spring to bring the control surface back to neutral. Other features of the invention will be brought out in detail during the course of the description now to follow.

Figure 2:
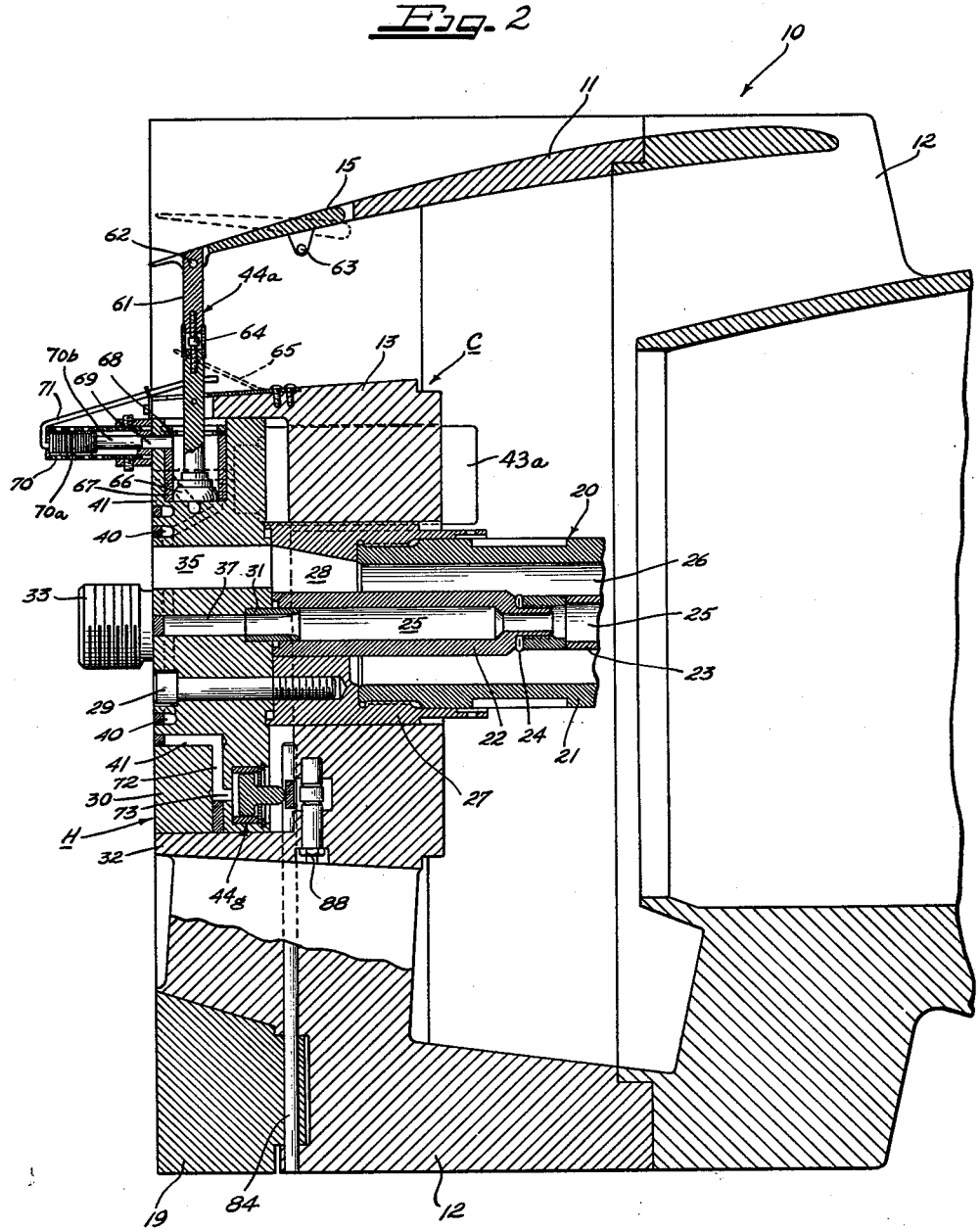
FIGURE 2 is a sectional view in generally a vertical plane and taken substantially along the line II—II of FIGURE 1.

Referring now to FIGURES 1 and 2, there is shown an exemplary torpedo tail cone assembly generally designated by the numeral 10, and which may comprise a ring member 11 of generally frusto-conical shape supporting stabilizing fins 12 thereon and connecting with an inner rim member 13 by spoke means or the like 14. The outer annulus 11 is formed with a pair of faired pitch control surfaces 15 and 16 at diametrally opposed locations thereon, while spaced from said surfaces approximately 90° along the ring member 11 is a pair of faired yaw control surfaces 17 and 18. A pair of diametrally opposed stabilizing fins 12 mount a pair of roll control surfaces 19 (one totally of which is shown in FIGURE 2), and the novel means to actuate the surfaces 15–19 will be described in detail hereinafter.

The tail assembly 10 connects with the fuselage of the torpedo in the known manner, and extending axially rearwardly or aft from the torpedo power plant (not shown) is a gas supply tube assembly 20 comprising a hollow outer casing 21 surrounding a pair of connecting tubular members 22 and 23 which abut seal means 24. The connecting tubes 22 and 23 provide a high pressure-high temperature gas flow passage 25 from the torpedo power plant, and said tubes are coaxially spaced from the outer casing 21 to form an annular exhaust gas passage 26. Typically, the gases flowing through the central passage 25 are at a temperature of about 2000° F. and at a pressure of about 2000 p.s.i., while the exhaust gases directed by the passage 26 have a temperature of about 1000° F.

The outer casing 21 of the supply tube assembly 20 threads into an adapter member 27 received by the inner annulus 13, and it may be seen that the adapter 27 is passaged at 28 for communication with the exhaust gas passage 26 and receives a plurality of stud means or the like 29 providing a mounting for a novel housing member 30. The connecting tube 22 of the gas supply assembly 20 abuts against the housing member 30, and leakage of the high pressure-high temperature gases is prevented by seal means 31.

The housing member 30 is preferably provided by a round stainless steel block, and is formed with a plurality of passages and openings to provide in a single body connecting gas flow paths to the actuating means for the control surfaces, chambers for the actuating means, and flow paths for the exhaust gases whereby the high temperature gas passages and actuating means are maintained at a sufficiently high temperature to reduce excessive gas consumption and to inhibit carbon deposition. The housing member 30 with cooperating components provides a hot gas servo system employing the propulsive gases from the torpedo power plant to directly actuate the hydrodynamic control surfaces, and thereby eliminates previously required hydraulic assemblies, resulting in substantially improved system reliability accompanied by marked cost and weight savings. The servo assembly, comprised of the housing member 30, adapter member 27 and the actuating means to be later described, may be readily employed on many known torpedoes without substantial modifications thereto, and by reason of its design simplicity may readily be completely bench checked prior to installation, only requiring for this purpose a high pressure gas source and suitable electrical connections for the solenoid valve means. The servo assembly, to now be described in detail, is accordingly characterized by low cost and high reliability, minimized gas consumption during operation, and minimized leakage at all times.

The housing member 30 may be seen from FIGURE 2 to be seated in a rearwardly extending flange portion 32 of the inner annulus or ring member 13, and as noted, is firmly connected with the gas supply tube assembly 20 by stud means or the like 29 threaded into the adapter member 27. The housing member 30 may mount a parachute connection 33, and extending completely through the housing member from the front to the rear surfaces thereof is a plurality of exhaust gas passageways 34–36, three of which are shown, although of course this number can be varied. The gas passageways 34–36 are in communication with the passages 28 and 26 of the adapter member 27 and gas supply tube assembly 20, respectively, and serve to maintain the temperature of the housing member 30 sufficiently high for the purposes earlier mentioned.

The passages in the housing member 30 to direct high pressure-high temperature gas for actuation of the control surfaces 15–19 comprise first an axial passage 37 communicating with the passage 25 of the connecting tubes 22 and 23, the axial passage 37 being in further communication with a pair of generally radially extending passages 38 and 39 which connect with an annular passage 40 and a pair of semi-circular or arcuate passages 41 and 42. The annular and semi-annular passages are in intercommunication, and the passage 40 serves solenoid valve means 43a–d for actuator means 44a–d operating the control surfaces 15–18, respectively. The semi-annular passage 41 communicates with diametrally opposite actuator means 44a and 44f through a single solenoid valve means 43e while semi-annular passage 42 connects through a single solenoid valve means 43f with another pair of diametrally opposite actuator means 44g and 44h. The solenoid valve means 43e and 43f and the actuator means 44e–h provide movement of the roll control fins 19, and the coupling of diametrally opposite actuator means to a single or common high pressure gas passage and control by a single solenoid valve means is required in order to co-ordinate the roll fins 19 to provide a balanced roll couple.

Figure 3:
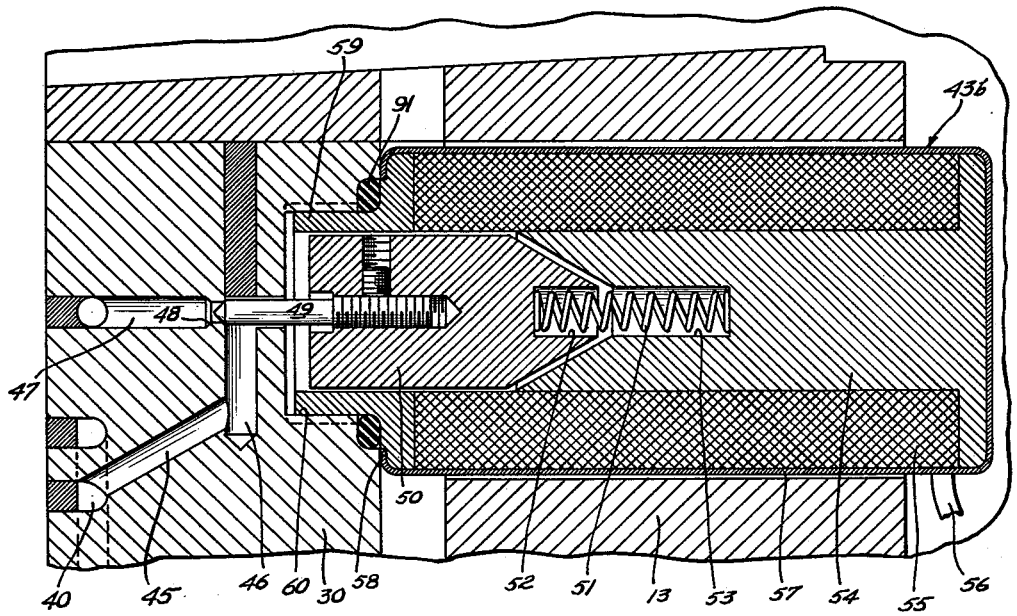
FIGURE 3 is a sectional view of a solenoid valve assembly employed in the present invention to control hot gas flow to the actuator means for the control surfaces of the torpedo.

The arrangement of gas flow passages serving the pitch control surfaces 15 and 16 and the yaw control surfaces 17 and 18 is essentially the same, and accordingly, the description now to follow will be limited to the passages serving the solenoid valve means 43b and actuator means 44b for the pitch control surface 16. Referring now also to FIGURE 3, the inner annular passage 40 may be seen to communicate with a generally diagonal passage 45 connecting with a radial passage 46 formed in the housing member. A generally axially extending passage 47 tapered at 48 provides a chamber for reciprocal movement of a valve stem portion 49 threaded at its opposite end into a valve member 50. The valve member 50 of the solenoid valve means 43b is normally urged to a position wherein the stem portion 49 closes the passage 47 to the actuator means 44b by means of a spring 51 bottoming at opposite ends in bore 52 in the valve member 50 and bore 53 in stationary valve member 54, surrounded by coil means 55 having a connection 56 thereto. The solenoid valve means 43b is further provided with an outer casing 57 which is turned inwardly at 58 to clampingly engage a collar member 59 which is tightly received in an opening 60 in the plate member 30.

The actuator means driven by hot gas flow controlled by the solenoid valve means 43 is shown in FIGURE 2 and identified as 44a, although it is of course appreciated that the other actuator means are identical. The actuator 44a comprises a stud portion 61 connected by a clevis pin joint 62 to the control surface 15 which pivots about a hinge point 63, and as earlier noted, varies with the outer annular member 11.

The strut portion 61 of the actuator means has adjustment means 64 associated therewith to facilitate correctly locating the hydrodynamic surface in a zero position. The strut portion 61 further connects with spring means 65 secured to the inner annulus 13 to return the control surface to a neutral or zero position after the solenoid has been deenergized and gas flow terminated.

The actuator means 44 is further provided with a piston 66 integral with the strut 61, and the piston may be seen to have a spherically crowned face which has the advantage of permitting a degree of misalignment with the hydrodynamic surface without danger of binding the piston. A further advantage of the contoured face is that it permits slightly off-center motion of the clevis end which results from motion about the hinge point 63 of the control surface. The piston 66 is reciprocal within a cylinder liner 67 received in a bore in the housing member 30, and the piston bottoms at one end against the bottom wall of the bore and at its opposite end against a retaining washer 68 which is perforated as shown to allow relief of exhaust gases which leak by the piston during normal operation.

Particular circumstances may require that the pitch pistons be limited during the high speed portion of the torpedo run to prevent violent maneuvers. For this purpose, the piston chamber may communicate at 69 with a perforated bellows stop housing 70 mounting therewithin a bellows stop 70a having a plunger portion 70b sized to the diameter of the passage 69. The bellows stop is actuated by pressures sensed by an impact tube or pilot tube 71 to extend the plunger portion 70b and limit piston travel.

To actuate the surfaces 15–18, the solenoid 55 for the particular surfaces is energized which causes rearward travel of the valve member 50 in opposition to the spring means 51, providing a gas flow path through the passages 25 and 37 to one of the radial passages 38 or 39 to the annular passage 40. Hot gas thereupon continues through the passages 45 and 46 and into the passage 47 to the cylinder chamber 67 to drive the piston 66 and strut 61 in a direction normal to the torpedo center line or axis. Gas continues to flow past the actuator, exhausting through the holes in the retaining washer and also through the actuator bleed port 69 and is discharged outside the vehicle. The actuator 44 remains in the full open position, and the surface fully extended as long as the valve member 50 is in the retracted or open position. To return the surface 15–18 to the neutral position, the valve solenoid 55 is merely deenergized, and thereby hot gas flow to the actuator is terminated, and gas remaining in the cylinder 67 bleeds out past the piston through the holes in the retaining washer 68 to permit the return spring 65 to bring the control surface back to the retracted or neutral position.

Figure 4:
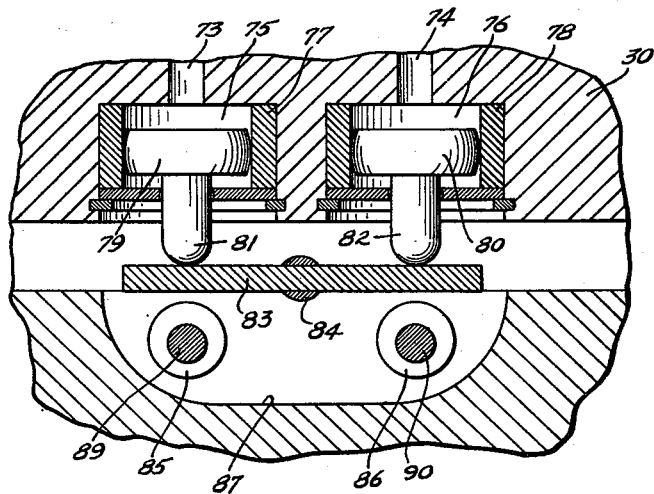
FIGURE 4 is a fragmentary sectional view of an actuator assembly for the roll control surfaces.

As earlier noted, the diametrically opposite roll fin actuators 44e and 44f are served by a single gas passage 41, while the diametrically opposite roll fin actuators 44g and 44h receive hot gases from the single passage 42. The gas flow paths provided from the passages 41 and 42 to the appropriate actuators are identical, and in FIGURE 2 there is shown the communicating passageways with the passage 41. It is to be seen that the housing member 40 is bored or otherwise formed with a radially extending passage 72 communicating at one end with the passage 41 and at its opposite end with a pair of relatively short length axial passages 73 and 74. Referring now also to FIGURE 4, the passages 73 and 74 communicate with cylinders 75 and 76 defined by liner 77 and 78 and receiving pistons 79 and 80 having rod portions 81 and 82 integral therewith.

The pistons 79 and 80 are shown in FIGURE 4 in a neutral position. When in this position, the piston rod portions 81 and 82 each contact a resilient stabilizer member 83 fastened at its center point to a roll fin shaft 84. However, it is of course appreciated that during actuation of a roll control surface 19 only one of said piston rod portions 81 or 82 exert a force against the stabilizer 83, and of course, movement of the pistons of diametrically opposed actuators is co-ordinated so that a balanced roll couple is always generated. As for example, and viewing FIGURE 1, to translate the pair of roll control fins in opposite directions, the piston 79 of the actuator 44e and the piston 80 of the actuator 44f are reciprocated, while the piston 79 of the actuator 44h is reciprocated simultaneously with reciprocation of the piston 80 of the actuator 44g.

Means are provided to limit the extent of travel of the roll fins, and this comprises a pair of cams 85 and 86 located in a pocket 87 in the inner annulus 13, the cams being adjustable by screw means 88 to rotate shaft means 89 and 90 supporting the cams 85 and 86, respectively.

As earlier noted, the solenoid valve means 43e controls hot gas flow to the actuating means 44e and 44f, while the solenoid valve means 43f controls the flow to the actuating means 44g and 44h. The two named solenoid valve means are constructed as described earlier in connection with FIGURE 3, and the semi-annular passage 42 supplies hot gas to the solenoid valve means 43f, while the semi-annular passage 41 supplies the solenoid valve 43e. As is apparent, gas flow to the actuating means 44e-h reciprocates the appropriate pistons, one on each side of the fin shaft 84, and the coordinated actuation bends the resilient stabilizer 83 into a sinusoidal shape, the specific configuration of which depends upon the direction in which the roll fin 19 must travel. The piston rod portions 81 and 82 ride against the stabilizer means 83 and are free to travel in their cylinders 75 and 76. Upon removal of the actuator load, the spring stabilizer 83 is no longer deflected, and the fin returns to neutral position.

It was noted in connection with the exhaust gas passages 26, 28 and 34–36 that particularly the latter group of passages perform the important function of maintaining the temperature of the housing member 30 at a sufficiently high level so that carbon deposition in the hot gas passages and in the actuator means is minimized. The housing member is desirably maintained at a temperature of about 1000° F., and there is accordingly provided what may be termed a "hot zone" identified generally in FIGURE 2 by the legend H. The solenoids 55 in their cases 57 are not exposed to such temperatures, however, but rather are cooled by the body of water in which the torpedo travels. Adjacent the solenoids, therefore, there is provided a "cool zone", and this is identified in FIGURE 2 by the legend C. Generally, the temperature to which the solenoids are exposed is approximately 60° F. To protect the solenoids 55 within the covers 57 from the temperature of the hot zone H, the two zones may be insulated one from the other, and this is shown in FIGURE 3 and identified therein by the numeral 91. Such insulation means 91 is suitably provided by a ring of fiber glass.

It may now be seen that applicants have provided a hot gas servo system utilizing high temperature-high pressure gases from the main propulsion system, resulting in a number of important advantages, including improved system reliability and substantial cost and weight savings. The provision of engine exhaust passageways results in a hot zone which maintains the valves, actuators and hot gas passages at sufficiently high temperature to inhibit carbon deposition. Further, by temperature control of the hot gas passages excessive gas consumption is reduced. The unitized assembly disclosed permits ready bench checking, and the space requirements for the servo assembly are minimum so that the assembly is adaptable to existing torpedoes with little change thereto. The roll control surfaces are co-ordinated, and the pitch and yaw control surfaces permitted a degree of misalignment with the actuators by provision of the spherical piston heads. Further, the control surfaces are held in a neutral position without electrical power or gas pressures, and accordingly, energy is required only for maneuvering, and if there is a power failure, the surfaces return to their neutral positions.

It is of course appreciated that various changes and modifications may be effected in the structures herein disclosed without departing from the novel concepts of the present invention.

We claim as our invention:
1. In combination with a vehicle having a propulsion system and mounting a tail assembly and control surfaces, the improvement which comprises a housing member sup- ported by the tail assembly at the end thereof and provided with a plurality of openings communicating with the propulsion system supply to direct hot gases therefrom and mount means for actuating the control surfaces, a first group of said openings formed in said housing member being in the form of a plurality of annular passages and connecting radial passages and a second group of the openings formed in said housing member being shaped to provide chambers for the actuator means, the path of hot gas flow being from the propulsion system supply to the radial passages and therefrom to the annular passages and chambers, the housing member being further provided with passageways receiving exhaust gases from the propulsion system to heat the housing member and maintain the first group of passages above a predetermined temperature to reduce the deposition therein of products of fuel decomposition.

2. In combination with a vehicle having a propulsion system and mounting a tail assembly and control surfaces, the improvement which comprises a housing member supported by the tail assembly and provided with a plurality of passages communicating with the propulsion system supply and receiving high temperature-high pressure gases therefrom, a plurality of passageways formed in said housing receiving exhaust gases from the propulsion system to heat the housing member, and a plurality of chambers formed in said housing connecting with the passages, and actuator means in the chambers and connecting with the control surfaces and being moved to translate the surfaces by high temperature-high pressure gases from the passages into the chambers, the passageways simultaneously receiving exhaust gases maintaining the housing member at a sufficiently high temperature to minimize the deposition of products of fuel decomposition in the passages and in the actuator means.

3. In combination with a vehicle having a propulsion system and mounting a tail assembly and control surfaces, the improvement which comprises a housing member supported by the tail assembly and provided with a plurality of passages communicating with the propulsion system supply and receiving high temperature-high pressure gases therefrom, a plurality of passageways formed in said housing receiving exhaust gases from the propulsion system to heat the housing member, and a plurality of chambers formed in said housing connecting with the passages, piston means in certain of said chambers and connecting with the control surfaces, valve means in other of the chambers and communicating with the piston means, and solenoid means supported by the tail assembly and connected to the valve means to open said valve means and permit the flow of high temperature-high pressure gases from the propulsion system supply through the passages to the piston chambers to move the pistons and control surfaces connected thereto, the passageways simultaneously receiving exhaust gases maintaining the housing member at a sufficiently high temperature to minimize the deposition of products of fuel composition in the passages and in the piston and valve means, the solenoid means being cooled by ambient conditions and spaced from the housing member a sufficient distance to maintain the temperature of the solenoid means relatively low.

4. In combination with a torpedo having a power plant connecting with a high pressure supply tube coaxially spaced from an exhaust gas tube, said torpedo having a tail assembly and control surfaces thereon, the improvement which comprises an adapter member connecting with the tail assembly and exhaust gas tube and provided with exhaust gas openings, and a housing member attached to the adapter member and having exhaust gas passageways formed therein communicating with the exhaust gas openings in the adapter and with the exhaust gas tube to heat the housing member, said housing member having a plurality of gas flow passages formed therein connecting with the high pressure supply tube and heated by exhaust gas in the passageways, the passages directing high pressure-high temperature gases from said supply tube through a plurality of radial, circumferential and radial paths formed in said housing to provide the actuation force for the control surfaces.

5. A servo housing assembly for attachment to a torpedo tail assembly and to receive exhaust gases and high pressure gases from the torpedo power plant, comprising a housing member having generally flat and parallel end faces and provided with at least one exhaust gas passageway extending therethrough from one face to the opposite face, said member being further provided with an axially extending high pressure gas passage and a plurality of connecting radial passages formed therein in communication with the torpedo power plant, the member additionally having formed therein a plurality of radially spaced circumferentially extending passages connecting with the radial passages and providing gas flow paths to actuating means, said exhaust gas passageway maintaining the housing member and passages therein at a sufficiently high temperature to prevent the substantial deposition of products of fuel decomposition.

6. A servo assembly for use in the actuation of movable members supported by a vehicle having a propulsion system, comprising a housing provided with a plurality of flow passages and a plurality of piston chambers communicating therewith and formed in said housing, means for mounting the housing on the vehicle and connecting the housing passages with the propulsion system to provide a pressurized high temperature gas flow to the piston chambers, piston means in each of the chambers connected to each of the movable members, valve means mounted in said housing and controlling the hot gas flow to the piston chambers, and solenoid means supported by the vehicle and connecting with the valve means to open and close the same, the solenoid means being exposed to a coolant fluid to maintain the temperature thereof sufficiently low for proper operation and the housing being heated by the gases for the propulsion system to maintain the passages therein and the piston and valve means at a sufficiently high temperature to minimize the deposition of products of fuel decomposition.

7. In combination with a vehicle having a main propulsion system and control surfaces to perform pitch, yaw and roll functions, the improvement which comprises a housing connecting with the propulsion system and provided with relatively high pressure-high temperature supply passages formed therein and exhaust gas passageways formed therein to maintain the passages at a sufficiently high temperature to inhibit the deposition therein of products of fuel decomposition, a plurality of actuator means supported by the housing in communication with the gas supply passages and heated by the passageways, one of the actuator means connecting with each of the pitch control surfaces, another actuator means being connected to each of the yaw control surfaces, and a pair of the actuator means connecting with a pair of roll control surfaces and with a common gas supply passage so that said surfaces are co-ordinated and a balanced roll couple generated, and valve means also heated by the passageways and controlling the flow of hot gases from the passages to the actuator means.

References Cited in the file of this patent

UNITED STATES PATENTS

| | | |
|---|---|---|
| 858,156 | Davison | June 25, 1907 |
| 1,305,340 | Bostedo | June 3, 1919 |
| 2,584,127 | Harcum et al. | Feb. 5, 1952 |
| 2,836,378 | Matthews | May 27, 1958 |